Patented May 29, 1945

2,377,008

UNITED STATES PATENT OFFICE 2,377,008

ANIMAL FOOD AND METHOD OF PREPARING THE SAME

Herman Heuser, Evanston, Ill.; Irene B. Heuser administratrix of said Herman Heuser, deceased No Drawing. Application October 1, 1941, Serial No. 413,216

5 Claims. (99—6)

The present invention relates to an animal food and a method of preparing the same, and more particularly to an inexpensive balanced food of high protein and vitamin content consisting essentially of molasses and yeast, the molasses being present in an amount sufficient to act as a preservative for the yeast. In its preferred form the food product is improved by the destruction or neutralization of the fermenting enzymes of the yeast in order to adapt the food for use with all farm animals.

Molasses itself is used as an animal food but it consists mainly of carbohydrates and does not provide a balanced or nutritive diet.

The present invention provides a food product which has a high protein content, a high vitamin content, is durable, and may be prepared at low cost for materials and labor. Yeast itself has been suggested for use in human consumption and even in animal consumption but particularly in the latter case it is not readily available in a suitable form and the yeast available, particularly when in the liquid or wet form, is highly unstable and cannot be kept under ordinary farm conditions.

The present product is a liquid which will remain in good condition indefinitely, the molasses being used in a proportion to preserve the yeast, and the yeast serving to enrich the molasses as a food.

The following is a process suitable for carrying out the invention:

The yeast crop in the yeast-producing plants is produced in a rather thin fluid condition. In preparing it for use in the present invention, it is concentrated, as for example by sedimentation or centrifuging, to thick-fluid yeast which is pumped into hydraulic filter presses and compressed therein to hand-dry cakes. The molasses used in the product is placed in a closed vessel provided with a stirrer and compressed yeast is added thereto in an amount which will be preserved by the molasses. During the addition, the stirrer is running and the two products are thoroughly mixed. A suitable vessel will contain say 4,000 lbs. of corn molasses, and compressed yeast weighing 1,000 lbs. will be suitably preserved by the molasses. The exact proportion used will vary according to the amount of water in the yeast and the molasses, as will be discussed hereinafter. The mixing of the products is continued until all of the yeast has been thoroughly dispersed in the molasses and no lumps are present. The process may be accelerated by breaking the yeast into small pieces before adding it to the molasses.

The resulting product is a fluid and may be filled into steel barrels of the type customarily used as trade containers for molasses. The product is stable indefinitely.

It has been found, however, that a product made as just described is unsuitable as food for ruminant animals such as cattle and sheep, in which animals it causes bloating if used in large quantity, particularly if the animal is given or is permitted to have much water at the same time. I have found that this is due to the fermenting enzyme of the yeast, the zymase, acting upon the sugar of the molasses. The product, in the form heretofore described, therefore, should be fed only to a non-ruminant animal such as hogs.

I have discovered, however, that the product may be made suitable for all types of farm animals including cattle and sheep and other ruminants, without destroying the food value thereof, if the yeast is treated before or after incorporation in the molasses to destroy the fermenting enzymes.

The following is one process which is suitable for the production of a yeasted molasses for all types of farm animals:

Sucrose molasses, such as cane molasses, or corn molasses in suitable quantity, as for example, 4,000 lbs., is placed in a closed vessel provided with a stirrer and a heating jacket (preferably a hot water jacket), and brought to a temperature sufficient to destroy the fermenting enzymes of the yeast which is to be added. A temperature of 68° C. is sufficient for this purpose. If the yeast has not been preheated it may be desirable to bring the molasses to a temperature sufficiently above 68° C. so that the resulting mixture will have that temperature. In so doing, however, care must be taken that the yeast is not deleteriously affected, and it is preferred not to have the molasses much above 68° C. at any time while yeast is present. The stirrer is run as before while 2,000 lbs. of compressed yeast are being added and the temperature kept as near the selected temperature as may conveniently be done. The yeast is maintained at that temperature until the fermenting enzyme has been destroyed, which, at 68° C., requires about 15 to 20 minutes.

A temperature of less than 60° C. will not destroy the fermenting enzyme in any suitable period of time, and temperatures above 100° C. are likely to destroy or deteriorate the value of the yeast. The time required depends somewhat on the temperature, a higher temperature requiring a somewhat shorter treatment.

Dairy cows fed daily with approximately 3 pints each of this product included in their ordinary ration have been found to remain in unusually good health and vigor. They have shown a marked increase in resistance to infectious diseases including tuberculosis, and an increased yield in both quality and quantity of milk.

Beef cattle, fed approximately 2 pints per day each of this product included in their regular ration, have been found to grow faster and put on more meat than cattle not fed with the product. Beef cattle so fed have likewise been found to keep free from infectious diseases, including the skin diseases met with on beef cattle.

The invention may be carried out at the lowest cost by the use of waste yeast from yeast-fermentation industries. The breweries of the United States alone waste approximately twice as much yeast as they use in the manufacture of their beverages. Brewers' yeast is, therefore, available at a relatively low price. Brewers' yeast contains a small amount of hop resins which can be removed if desired, but which may be retained in the product with value.

While the foregoing examples show a yeasted molasses product containing 20% and 33⅓% of compressed yeast, these percentages may be varied somewhat. It is preferred not to use less than 10% of the compressed yeast, and in actual operation it is desirable not to use substantially less than 20%. The upper limit is determined largely by the preserving powers of the molasses. Under ordinary conditions it is preferred not to use over 25% of compressed yeast for yeasted molasses, and 50% of compressed yeast for yeasted molasses free from the fermenting enzyme of yeast.

While I have described the destruction of the fermenting enzyme of the yeast by heat, it may also be destroyed in other ways, for example by autolyzing the compressed yeast prior to its incorporation into the molasses. The autolysis destroys the enzymes without impairing the vitamins of the yeast. Ordinary autolyzed yeast putrefies rapidly but the molasses will preserve that material as well as ordinary compressed yeast. The autolysis, however, is an expensive and slow operation and the heating method of destroying the enzymes is preferred, other factors being equal. The autolysis may be hastened by maintaining the yeast at a temperature of 37° to 40° C.

While the invention has been described with compressed yeast, dry yeast products or more moist yeast products such as thick-fluid yeast may be employed. In the case of yeast containing more water than compressed yeast, the ratio of yeast to molasses must be maintained at a lower level. The ratio of molasses to yeast in the claims hereof is based upon the use of compressed yeast.

The foregoing detailed description has been given for clearness of understanding only, and no unnecessary limitations should be understood therefrom.

What I claim as new, and desire to secure by Letters Patent, is:

1. A liquid food product for farm animals consisting essentially of yeast free from its fermenting enzyme, and molasses, the proportion of the yeast being from 10% to 50% of the product and the balance being entirely molasses.

2. A product as set forth in claim 1, in which the product was made with 33⅓% of yeast.

3. The process of making a yeasted molasses food which comprises heating molasses to a temperature sufficiently high to destroy the fermenting enzyme of yeast but low enough not to deleteriously affect the vitamins of the yeast, adding a preservable quantity not over 50% of the total of yeast to the heated molasses while maintaining a temperature sufficiently high to destroy the fermenting enzyme of the yeast without deleteriously affecting the vitamin content thereof, and maintaining the temperature in this range until the fermenting enzyme of the yeast has been destroyed.

4. The process as set forth in claim 3, in which the temperature is maintained at approximately 68° C.

5. The process of preparing a yeasted molasses food which comprises heating a mass of molasses to a temperature above 60° C. and below 100° C., adding from approximately 25% to approximately 50% by weight of yeast thereto, based upon the weight of the molasses, while maintaining in the mass a temperature above 60° C. and below 100° C., continuing the heating of the mass in said range until the fermenting enzyme of the yeast has been destroyed and then cooling the composition.

HERMAN HEUSER.